Jan. 29, 1935. F. C. HARMS 1,989,515
REFLECTOR
Original Filed April 2, 1931
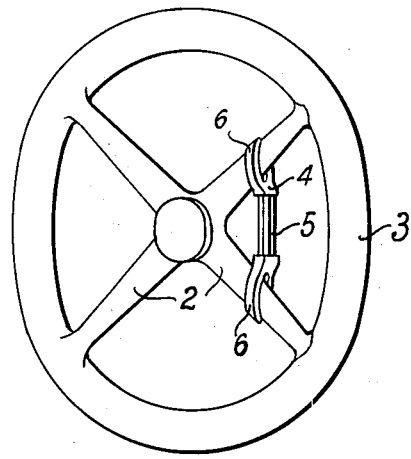
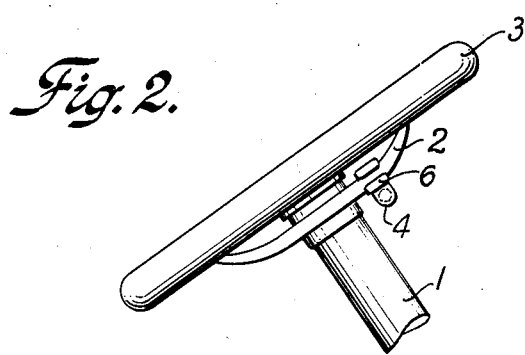
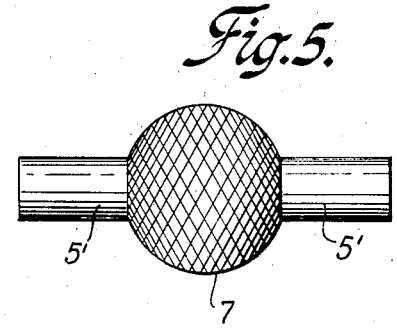
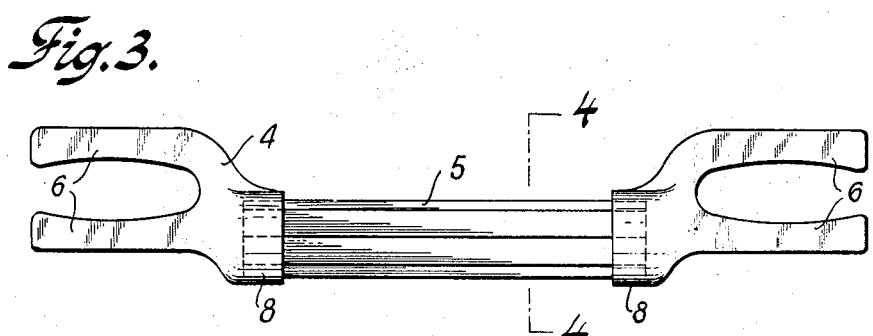
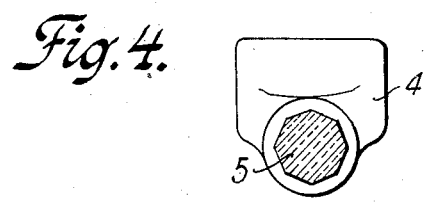

Patented Jan. 29, 1935

1,989,515

UNITED STATES PATENT OFFICE 1,989,515

REFLECTOR

Fred C. Harms, New Rochelle, N. Y.

Application April 2, 1931, Serial No. 527,229
Renewed June 27, 1934

5 Claims. (Cl. 88—1)

My present invention relates to reflectors and has particular reference to reflectors or mirrors for mounting on the steering wheel of an automobile or the like, embodying novel features of construction whereby the driver is enabled to extend his field of vision to include an overhead object such as, for example, a traffic signal light which may be directly over the roadway or overhead at one side of the roadway.

A further object of the present invention is to provide a device for the purpose described which is simple and rugged in construction, of low manufacturing cost, completely foolproof, and which can be instantly placed in position on any car without the use of tools or material.

A still further object of the present invention is to provide a device for the purpose described effective in performance and capable of adjustment to meet the driver's requirements.

With the foregoing and other objects in view which will be apparent to those skilled in the art as the description proceeds, my invention resides in the combination and arrangement of parts and in the details of construction described in this specification and particularly pointed out in the appended claims, it being understood that changes may be made within the scope of what is claimed without departing from the spirit of the invention. I intend no limitations other than those of the claims when fairly interpreted in the light of the accompanying disclosure.

An embodiment of my invention which I at present prefer is shown for illustrative purposes in the accompanying drawing in which Fig. 1 is a top view of a steering wheel on which is mounted a reflector device embodying my invention;

Fig. 2 is a side view of a steering wheel of an automobile with a reflector device embodying my invention shown in position;

Fig. 3 is a detail view of a reflector device embodying my invention;

Fig. 4 is a sectional view on line 4—4 of Fig. 3;

Fig. 5 illustrates an alternative reflector element.

Similar reference characters refer to similar parts in all the views.

Referring now particularly to Fig. 3, a multi-sided reflector element 5, here shown as a prism or rod with eight faces, is supported in two bifurcated end members 4, 4, forming a complete unit. In this particular embodiment of my invention I at present prefer to make the reflector element 5 of glass or a material having a highly polished stainless surface for reflection. The end members 4, 4, may be rubber of suitable hardness and flexibility or other resilient material having gripping fingers 6, 6, adapted to slip over the spokes or arms 2, 2, of a steering wheel 3 as indicated in Fig. 1. Preferably the device of Fig. 3 is short enough to go between the spokes 2, 2, of the wheel 3 at the periphery and, as the device is forced in towards the center of the wheel, the fingers 6, 6, grip over the spokes 2, 2, and the device is frictionally held in position. By reason of the resilient construction of the fingers 6, 6, the spokes 2, 2, are not scratched or injured.

I prefer to hold the reflector element 5 in recesses in members 4, 4, as at 8, 8, and if the members 4, 4, are of rubber or the like the element 5 will be retained frictionally. Reflector element 5 may be frictionally adjusted rotatively within the recesses or sockets 8, 8, if desired. I prefer, however, to make the number of reflecting faces of the prism 5 sufficiently great even to the extent of forming a cylinder, to avoid the necessity of rotational adjustment except in the case of an injured surface.

The normal backward slope of the steering column 1 (Fig. 2) permits light rays falling through the windshield of a car (not shown) to strike the reflecting surfaces of the reflector element 5 without interference from the rim of the steering wheel 3.

An alternative reflector element 5' may have an enlarged, even spherical, center portion 7 (Fig. 5) which may have a smooth reflecting surface or, as shown, a surface of many facets.

Adjustment of the reflector device to better enable side positioned overhead objects to be seen may readily be made by turning the steering wheel itself, thus moving the reflector device with it and changing the angle of the reflecting surface with respect to any fixed ray of light. It is apparent that in this manner the entire overhead space in front of the wheel may be explored and a position found where reflection to the eye of the driver is obtained.

What I claim as new and desire to secure by Letters Patent is:

1. In a device of the class described, a reflector element, end members adapted and arranged to hold said reflector element, and support means integral with said end members comprising resilient finger members adapted and arranged to grip the spokes of an automobile steering wheel.

2. In a device of the class described, a reflector element and end support members therefor comprising bifurcated, resilient gripping means adapted to wedge said reflector element between the spokes of an automobile steering wheel.

3. In a device of the class described, a prism and end support means therefor comprising a plurality of bifurcated members of resilient material adapted and arranged to grip the spokes of an automobile steering wheel.

4. An article of manufacture comprising a reflector element held in two recessed end members of resilient material said members being bifurcated for attachment of said reflector element to a support.

5. The combination with an automobile steering wheel having a steering post sloping backwards, of a reflector element and end support members recessed therefor and bifurcated for removable attachment to the spokes of the steering wheel whereby to suspend said reflector element forward of said post and below the rim of said wheel and movable with said wheel.

FRED C. HARMS.